US009540522B2

(12) United States Patent
Lopez Lavernia et al.

(10) Patent No.: US 9,540,522 B2
(45) Date of Patent: Jan. 10, 2017

(54) ANTIFOULING LAYER FOR COMPRESSOR BLADES

(71) Applicant: MTU Aero Engines AG, Munich (DE)

(72) Inventors: Natividad Lopez Lavernia, Munich (DE); Max Niegl, Munich (DE); Melanie Heusing, Rinteln (DE)

(73) Assignee: MTU AERO ENGINES AG, Munich (DE)

( * ) Notice: Subject to any disclaimer, the term of this patent is extended or adjusted under 35 U.S.C. 154(b) by 0 days.

(21) Appl. No.: 14/794,036

(22) Filed: Jul. 8, 2015

(65) Prior Publication Data

US 2016/0009927 A1 Jan. 14, 2016

(30) Foreign Application Priority Data

Jul. 9, 2014 (DE) .................. 10 2014 213 327

(51) Int. Cl.
| | | |
|---|---|---|
| *C09D 5/16* | (2006.01) | |
| *C08K 3/22* | (2006.01) | |
| *C08K 3/36* | (2006.01) | |
| *C09D 183/06* | (2006.01) | |
| *F01D 5/28* | (2006.01) | |
| *C09D 183/04* | (2006.01) | |
| *F04D 29/02* | (2006.01) | |
| *F04D 29/32* | (2006.01) | |
| *B05D 3/02* | (2006.01) | |

(52) U.S. Cl.
CPC ............... *C09D 5/1675* (2013.01); *C08K 3/22* (2013.01); *C08K 3/36* (2013.01); *C09D 183/04* (2013.01); *C09D 183/06* (2013.01); *F01D 5/288* (2013.01); *F04D 29/023* (2013.01); *F04D 29/324* (2013.01); *B05D 3/02* (2013.01); *B05D 2601/10* (2013.01); *C08K 2003/2227* (2013.01); *C08K 2003/2241* (2013.01); *F05D 2220/30* (2013.01); *F05D 2230/90* (2013.01); *F05D 2300/21* (2013.01); *F05D 2300/211* (2013.01); *F05D 2300/212* (2013.01); *F05D 2300/2112* (2013.01); *F05D 2300/2118* (2013.01); *F05D 2300/437* (2013.01); *F05D 2300/603* (2013.01); *F05D 2300/611* (2013.01); *F05D 2300/615* (2013.01); *Y02T 50/673* (2013.01)

(58) Field of Classification Search
None
See application file for complete search history.

(56) References Cited

U.S. PATENT DOCUMENTS

| | | | |
|---|---|---|---|
| 5,985,454 A | 11/1999 | McMordie et al. | |
| 6,107,381 A | 8/2000 | Stein et al. | |
| 6,159,547 A | 12/2000 | McMordie et al. | |
| 7,514,498 B2 * | 4/2009 | Kang ................ | C09D 183/04 106/287.16 |
| 8,329,307 B2 | 12/2012 | Pouchelon et al. | |
| 8,450,443 B2 | 5/2013 | Williams et al. | |
| 8,889,809 B2 | 11/2014 | Hamamoto et al. | |
| 8,968,459 B1 * | 3/2015 | Liu ................... | C09D 183/04 106/13 |
| 2005/0019589 A1 * | 1/2005 | Wiedemann .......... | B05D 5/02 428/450 |
| 2007/0266896 A1 * | 11/2007 | Suwa ................. | C09D 5/006 106/287.16 |
| 2009/0264035 A1 | 10/2009 | Pouchelon et al. | |
| 2010/0137529 A1 | 6/2010 | Williams et al. | |
| 2011/0309407 A1 | 12/2011 | Hamamoto et al. | |

FOREIGN PATENT DOCUMENTS

| | | | |
|---|---|---|---|
| DE | 19606011 A1 | | 8/1997 |
| EP | 0885938 A2 | | 12/1998 |
| GB | 2428604 A | | 2/2007 |
| KR | 2013/094093 | * | 8/2013 |
| WO | 2008107113 A1 | | 9/2008 |
| WO | 2008132196 A1 | | 11/2008 |
| WO | 2009144495 A2 | | 12/2009 |
| WO | WO 2014/174215 A1 | * | 10/2014 |

OTHER PUBLICATIONS

Machine-generated translation of KR 2013/094093 into English.*

* cited by examiner

*Primary Examiner* — Marc Zimmer
(74) *Attorney, Agent, or Firm* — Abel Law Group, LLP

(57) ABSTRACT

The present invention relates to a composition for producing a coating having antifouling properties on a component of a turbomachine. The composition comprises a binder comprising at least one silicon-organic constituent, ceramic particles and a solvent, the ceramic particles comprising at least silicon dioxide and the silicon-organic constituent comprising at least alkoxysilane. In addition, the present invention relates to a process for producing a coating using such a composition and also a correspondingly produced coating and a component provided therewith.

15 Claims, No Drawings

ANTIFOULING LAYER FOR COMPRESSOR BLADES

CROSS-REFERENCE TO RELATED APPLICATIONS

The present application claims priority under 35 U.S.C. §119 of German Patent Application No. 10 2014 213 327.0, filed Jul. 9, 2014, the entire disclosure of which is expressly incorporated by reference herein.

BACKGROUND OF THE INVENTION

1. Field of the Invention

The present invention relates to a composition and a process for producing a coating for components of a turbomachine having antifouling properties and also to a corresponding coating and a component of a turbomachine coated therewith.

2. Discussion of Background Information

In turbomachines such as stationary gas turbines or aircraft engines ambient air is sucked in and burnt together with the fuel in the combustion chamber in order to be ejected as combustion gases. When the ambient air is sucked in, impurities present in the air, for example sand, soot particles, salt and the like, also get into the turbomachine, where they can lead to deposits on engine components, which can lead to damage to the engine components and/or to impairment of the efficiency of the turbomachine by alteration of the surface quality of the components of the turbomachine by means of the deposits. Particularly in the case of aircraft engines which are operated in different environments, the deposition of impurities sucked in with the ambient air represents a serious problem.

To counter this problem of formation of deposits, which is also referred to as "fouling", attempts have been made in the past to provide the surfaces of components with coatings which have antifouling properties, as are described, for example, in DE 196 06 011 A1, EP 0 885 938 A2, U.S. Pat. No. 6,159,547 A, WO 2008/132196 A1 or GB 2 428 604 A, the entire disclosures of which are incorporated by reference herein.

However, the known antifouling layers either display unsatisfactory antifouling properties, especially when used in aircraft engines, or are unsuitable for the expected or desired environmental conditions in turbomachines. In addition, there is the problem that antifouling layers frequently contain Cr(VI) compounds which owing to their health-endangering properties and the processing difficulties resulting from the high safety requirements are not practicable to use.

In view of the foregoing, it would be advantages to have available a coating which provides antifouling properties for components of turbomachines. The corresponding coating should be reliable to use under the ambient conditions of a turbomachine and make safe and uncomplicated production, processing and use possible.

SUMMARY OF THE INVENTION

The present invention provides a composition for producing a coating having antifouling properties for components of a turbomachine, a process for producing such a coating, a coating and a component of a turbomachine having such a coating as set forth in the appended claims. Advantageous embodiments are set forth in the dependent claims.

The invention provides a composition for producing a coating having antifouling properties for components of a turbomachine, said composition comprising a binder having at least one silicon-organic constituent, ceramic particles and at least one solvent. The ceramic particles comprise silicon dioxide, and at least one alkoxysilane is provided as silicon-organic constituent. Layers based on such compositions have a property profile which has been found to be extraordinarily suitable for use in aircraft engines and especially on blades in the compressor.

In one aspect of the composition, the ceramic particles may have an average or maximum particle size of less than or equal to 4 µm. This particle size of the ceramic particles usually results in particularly good aerodynamic properties of a corresponding coating for turbomachines. In particular, a coating which has an average peak-to-valley height of ≤2 µm can be produced therewith. The average peak-to-valley height of ≤2 µm not only improves the aerodynamic properties of the coating and the components provided with the coating so that use in turbomachines is practicable but also improves the antifouling properties as a result of the smoothing of the surface.

The ceramic particles may comprise one or more further components such as, for example, aluminum oxide, titanium oxide, zirconium oxide, aluminum titanate, aluminosilicates, feldspar, zeolites and kaolin in addition to silicon dioxide. The oxide-ceramic particles, such as aluminum oxide, titanium oxide, aluminum titanate, aluminosilicate, preferably have particle of from 0.2 µm to less than 4 µm.

When the corresponding particle sizes are indicated, they always refer to an average particle size or a maximum particle size of the corresponding fraction, unless expressly indicated otherwise.

Apart from the inorganic fillers or pigments in the form of oxidic particles, the composition may comprise further fillers which can give the coating to be produced by the composition particular, improved properties. For example, the composition may additionally contain fluorosilanes which, in the coating, reduce the adhesion of foreign materials to the coating and can thus counter a corresponding deposit, so that the antifouling properties are improved. Furthermore, graphite may be present in addition or as an alternative.

The binder of the composition comprises at least one silicon-organic constituent in the form of one or more alkoxysilanes. However, further silicon-organic constituents may be present as well. Here, silicon-organic means that the compound concerned is a carbon compound which also comprises silicon and can, for example, be formed by polysiloxanes. The binder can comprise one or more of these silicon-organic constituents and combinations thereof.

The composition may further comprise process additives. For the purposes of the present invention, process additives are additions which during processing give the composition particular properties, for example dispersants, antifoams, leveling agents, thickeners, etc.

The solvent of the composition may consist of or comprise an organic solvent, in particular an alcohol, and/or may consist of or comprise water. Other organic solvents such as esters and ketones may be used as well.

The composition may have a solids content of, e.g., from 10% by wt to 40% by wt, in particular from 20% to 30% by wt.

The ceramic particles may be present in a concentration of, e.g., from 5% by wt to 50% by wt, in particular from 10% by wt to 20% by wt, based on the solids content.

A composition corresponding to the above specifications can after cleaning of the workpiece surface, be applied to a component of a turbomachine to be coated, for example a component of a titanium or nickel alloy, and subsequently be dried and cured in order to form an antifouling coating. The application can be carried out in any suitable way, for example by painting, squirting, spraying or dipping the component into the corresponding composition.

Curing can be carried out by heat treatment at a temperature in the range of, e.g., from 200° C. to 350° C., in particular from 250° C. to 300° C., for a time of from, e.g., 10 minutes to 120 minutes, in particular from 15 minutes to 60 minutes. The heat treatment can be carried out in air.

In one embodiment, the composition can be applied in two or more sublayers to the component to be coated, with a preceding sublayer firstly being dried at room temperature before at least one subsequent sublayer is applied by one of the abovementioned methods and dried. The dried sublayers can then be cured together. However, curing of an individual sublayer after it has been applied is also conceivable.

It is possible to apply a sufficient total number of sublayers for the layer thickness of the layer formed to be in the range of, e.g., from 5 μm to 30 μm, in particular from 5 μm to 15 μm.

The finished coating comprises a matrix composed of a binder which comprises at least one silicon-organic compound. Ceramic particles are embedded in this matrix and are homogeneously and uniformly distributed in the matrix. The ceramic particles comprise silicon dioxide particles, while the silicon-organic compound comprises at least one alkoxysilane and/or a hydrolysate and/or condensate of one or more alkoxysilanes.

In one aspect, the ceramic particles may, in the context of the abovementioned composition, have an average or maximum particle size of less than or equal to 4 μm.

The further silicon-organic compounds and the ceramic particles which can be present in the coating correspond to the materials indicated for the composition or their products after curing, so that a repeated description can be dispensed with.

A corresponding coating may have an average peak-to-valley height of ≤2 μm. The peak-to-valley height $R_z$ is defined in that a predetermined measurement line on the surface of the workpiece is divided into seven equally sized individual measurement lines, the profile is measured in the individual measurement lines and the difference between the maximum and minimum values is determined. The maximum or minimum value here relates to the maximum or minimum height or depth of the surface layer. The average of five of the abovementioned part-lines is formed and the average peak-to-valley height is thus obtained.

In an advantageous embodiment, the coating can be provided on a compressor blade of an aircraft engine. It is advantageous here that the coating is simple to remove and can thus be reapplied when required.

DETAILED DESCRIPTION OF EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show details of the present invention in more detail than is necessary for the fundamental understanding of the present invention, the description making apparent to those of skill in the art how the several forms of the present invention may be embodied in practice.

WORKING EXAMPLE

In a working example, 620 g of an alkoxysilane is placed in a covered 2000 ml glass beaker and mixed with 200 g of butyl acetate at room temperature for one hour in the fume hood by stirring by means of a high-speed mixer. 60 g of a submicron titanium dioxide (from Sachtleben) and 65 g of a micron-sized aluminum titanate (from Alroko) and 80 g of silicon dioxide are subsequently added as powders and the mixture is stirred for a further 30 minutes. The materials can also be made up separately beforehand as a powder mixture.

After reduction of the stirrer speed to 200 rpm, 15 g of graphite and 10 g of a commercial leveling additive (BYK) are added and the mixture is stirred for a further 30 minutes. After spreading of a sample on glass, which should be free of lumps, the coating material is introduced into a SATA-VLP low-pressure spray gun and sprayed onto the component at 2 bar. After drying at room temperature for one hour, the coating is baked at 250° C. for one hour. After baking, a layer thickness of about 10 μm is obtained.

The corresponding constituents of the composition are mixed with one another by stirring and, for example, applied to at least parts of a compressor blade of a turbomachine by spraying. The corresponding compressor blade is exposed at 300° C. in an oven for one hour in order to cure the coating.

The finished coating, which extends at least partly over the compressor blade, has, due to among other things the fine ceramic particles, a low average peak-to-valley height which gives the coated component an advantageous smoothness which both improves the antifouling properties and meets the aerodynamic requirements of a compressor blade in a turbomachine.

Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A process for providing a coating having antifouling properties on a component of a turbomachine, wherein the process comprises applying to the component a coating composition which comprises a binder comprising at least one silicon-organic constituent that comprises at least one alkoxysilane, ceramic particles which comprise at least silicon dioxide, and a solvent; and subsequently curing the coating composition by a heat treatment at a temperature of from 200° C. to 350° C. for from 10 minutes to 120 minutes.

2. The process of claim 1, wherein the heat treatment is carried out at a temperature of from 250° C. to 300° C.

3. The process of claim 2, wherein the heat treatment is carried our for 15 minutes to 60 minutes.

4. The process of claim 1, wherein the ceramic particles have an average or maximum particle size of less than 4 μm.

5. The process of claim 1, wherein the silicon-organic constituent further comprises one or more polysiloxanes.

6. The process of claim 1, wherein the ceramic particles further comprise one or more of aluminum oxide, titanium oxide, zirconium oxide, aluminum titanate, an aluminosilicate, feldspar, a zeolite, kaolin.

7. The process of claim 1, wherein the composition further comprises at least one fluorosilane and/or graphite.

8. The process of claim 1, wherein the composition has a solids content of from 10% by wt to 40% by wt.

9. The process of claim 8, wherein the ceramic particles are present in a concentration of from 10% by weight to 20% by weight, based on the solids content of the composition.

10. The process of claim 1, wherein the composition is applied in several sublayers.

11. The process of claim 10, wherein a first sublayer is applied using the composition and dried at room temperature and, after drying of the first sublayer, a second sublayer is applied using the composition and dried, whereafter the first and second sublayers are cured together.

12. The process of claim 1, wherein a coating thickness is from 5 μm to 30 μm.

13. The process of claim 1, wherein a coating thickness is from 5 μm to 15 μm.

14. The process of claim 1, wherein the coating has an average peak-to-valley height of not more than 2 μm.

15. The process of claim 1, wherein the component is a compressor blade.

\* \* \* \* \*